United States Patent [19]

Gorshe

[11] Patent Number: 4,757,500
[45] Date of Patent: Jul. 12, 1988

[54] METHOD FOR ZERO BYTE TIME SLOT INTERCHANGE

[75] Inventor: Steve S. Gorshe, Glendale, Ariz.

[73] Assignee: GTE Communications Systems Corporation, Phoenix, Ariz.

[21] Appl. No.: 944,090

[22] Filed: Dec. 22, 1986

[51] Int. Cl.[4] .............................. H04J 3/00; H04J 3/12
[52] U.S. Cl. ............................................................ 370/99
[58] Field of Search ............... 370/68, 99, 110.1, 68.1, 370/100; 379/65, 93, 94

[56] References Cited

U.S. PATENT DOCUMENTS

| 4,254,401 | 3/1981 | Chemla et al. | 364/200 |
| 4,394,759 | 7/1983 | Donne | 370/110.1 |
| 14,685,100 | 8/1987 | Coppens et al. | 370/110.1 |

Primary Examiner—Douglas W. Olms
Assistant Examiner—Frank M. Scutch, III
Attorney, Agent, or Firm—Frank J. Bogacz; Peter Xiahros

[57] ABSTRACT

This method is a scheme for suppressing excessive amounts of logic zeros transmitted via T-carrier line facilities between switching systems or channel banks. This scheme provides proper zero bit suppression for alternating mark inversion signalling (AMI). A proper AMI signal contains no more than 15 consecutive logic zero bit positions. This scheme provides for encoding and decoding a 4 frame octet group of an extended superframe. Logic ones are introduced into octets which would otherwise violate the AMI signalling rules. These logic ones are then removed by the receiving system and replaced with the indicated all zero octets before being given to down stream processing. This scheme provides for minimal buffering at the encoding system, which facilitates error detection and correction by the decoding system.

9 Claims, 3 Drawing Sheets

METHOD FOR ZERO BYTE TIME SLOT INTERCHANGE

CROSS REFERENCE TO RELATED APPLICATIONS

The present application is related to co-pending applications U.S. Ser. Nos. 86-7-038 and 86-7-040, having the same inventive entity and being assigned to the same assignee as the present application.

BACKGROUND OF THE INVENTION

The present invention pertains to data transfer between switching and transmission systems and more particularly to a line format for zero byte time slot interchange which satisfies T1 line zero suppression requirements.

T1 transmission line facilities operate ar 1.544 M bits per second. The T1 line transmission facilities utilize an alternating mark inversion (AMI) signaling scheme. This AMI signal contains no more than 15 consecutive zero bit positions in a particular T1 bit stream. This requirement of not more than 15 zero bits in a string derives from the operation of repeaters in T1 transmission line systems. Commonly used repeaters may not operate within specification if more than 15 consecutive zeroes are transmitted. Repeater synchronization cannot be guaranteed for bit streams with more than 15 consecutive zeroes.

One technique used for T1 line 0 bits suppression is bipolar with 8 zeroes substitution (B8ZS). The B8ZS technique utilizes two special coding patterns containing bipolar violations which are substituted for strings of 8 zeroes in the input signal stream. Upon detecting bipolar violations with either of the two special patterns, the receiver places 8-bits of zeroes in the corresponding positions in the output bit stream.

One technical disadvantage of the B8ZS technique is that it violates the AMI signaling standard on T1 lines. Since bipolar violations normally indicate transmission errors, the deliberate introduction of these transmission errors by B8ZS signaling reduces the effectiveness of determining real errors which are detected by the AMI signaling scheme. Another disadvantage of the B8ZS technique is that it detects strings of 8 zeroes and substitutes the special violation patterns more frequently than the specified T1 line operation requires. In addition to these disadvantages, the B8ZS patterns will not propagate through standard multiplexer derived DS1 facilities or protected T1 facilities.

Severe economic disadvantages obtain for the introduction of the B8ZS technique into the North American transmission network. This introduction would require a global replacement of existing multiplexers, automatic protection switches, electronic cross-connect devices (DACS), digital switch interface hardware and any other item in the network with violation monitor and removal (VMR). Such an introduction of the B8ZS technique presents an unreasonably large capital investment requirement to change network hardware.

SUMMARY OF THE INVENTION

A data transmission system includes first and second digital switching systems. These switching systems are connected via T-carrier line facilities for the bidirectional transmission of data. Each of the switching systems includes a method for Zero Byte Time Slot Interchange (ZBTSI).

First, the zero byte time slot interchange method examines an octet (8-bit quantity) of a plurality of frames of data. Next, the method tests this octet for determining whether it is an all zero octet. An all zero octet is one in which 8-bits of zeroes constitute the contents of the octet.

If an all zero octet is detected, the address of that octet is placed into the contents of that all zero octet position. Another test is made to determine whether the detected all zero octet is a first all zero octet of the plurality of trames. If this octet is a first detected all zero octet of the plurality of frames, a first all zero octet indicator bit is set within the contents of the present all zero octet. Lastly, each of the above mentioned steps is iterated until each of the octets of the plurality of frames of data has been examined for a zero contents.

A BRIEF DESCRIPTION OF THE DRAWINGS

DESCRIPTION OF THE PREFERRED EMBODIMENT

Figure 1:
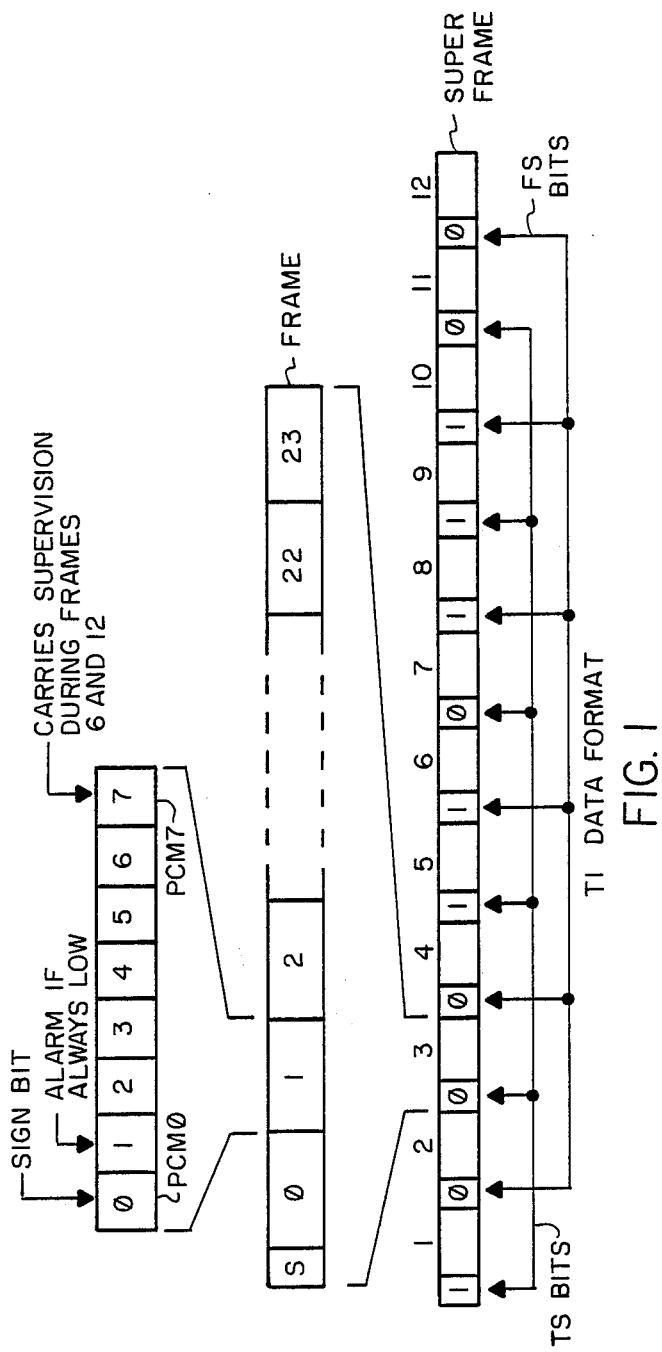
FIG. 1 is a layout diagram of typical T1 frame data format.

The structure of the T1 line format is based on the standard 1.544 M bits per second DS1 digital signal format. This structure is shown in FIG. 1. The DS1 frame contains 193 bits of information. This information is organized into a single bit of synchronization or framing data plus 192 bits of payload data. The 192 bits of payload data are organized into 24 channels, each channel containing 8-bits and can be referred to as in octet.

In the DS1 signaling, the least significant bit, PCM 7, of each octet in every sixth frame is commonly used as a robbed or stolen signaling bit to indicate the signaling states of the active channels. These signaling bits are transmitted at a rate of 24 bits per 6 frames or 4 bits per frame.

Each channel (octet) consists of eight birs, PCM0–PCM7. PCM0 is a sign bit. PCM1–PCM7 give the magnitude of the voice sample. PCM1 may also be used to convey alarm indications. PCM7 is used to carry supervision information during frames 6 and 12.

Twenty-four channels are organized together with an S bit to form a frame. Each voice sample in the frame is associated with one channel of voice (or data). The channels are numbered 0–23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels.

The periodic pattern of data carried by the S bit also makes it possible to identify the individual frames wihtin a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frame the S bit carries the patten "001110", where the first "1" indicates the beginning of frame 6. This pattern is referred to as the FS pattern and is used to identify the position within a super frame.

Examination of FS bits is an analoguous procedure to that the TS bits, except for the fact that no check is made for FS bits occuring during frames 2 and 8.

Figure 2:
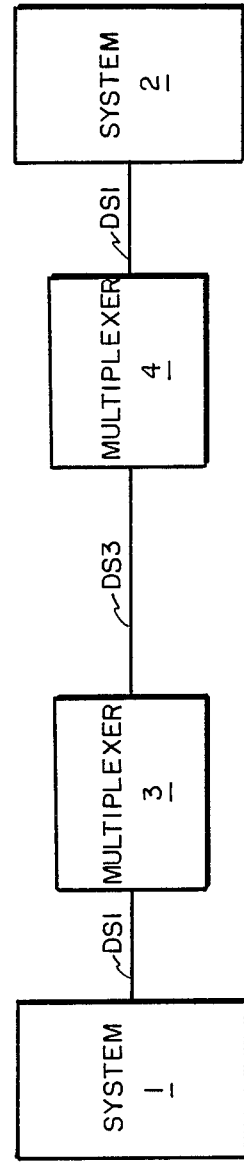
FIG. 2 is a block diagram of interconnected telecommunications systems.

In FIG. 2, system 1 is shown connected to system 2. System 1, which may comprise a telecommunication switching system or a channel bank, is shown connected to multiplexer 3. This connected is accomplished by a transmission line employing T1 or DS1 transmission. The transmission rate of a T1 or DS1 transmission line is 1.544 Megabits per second. Similarly, system 2 is shown conntected via another DS1 transmission line to multiplexer 4. Multiplexers 3 and 4 may be connected via a high speed transmission line, such as a DS3 transmission line. The DS3 transmission line transmits data at approximately a 45 Megabit per second rate.

The standard superframe as shown in FIG. 1 contains 12 frames of information. For purposes of this method it is assumed that an extended superframe will be employed. This extended superframe includes 24 frames of information.

In order to provide multiplexers, such as multiplexers 3 and 4, and repeaters with the proper ones (logic 1s) density of data on the transmission line, the following requirement must be achieved. No more than 15 consecutive bits of zero may appear within a transmitted string of data.

The present zero byte time slot interchange (ZBTSI) method provides for flagging each group of 4 rames (or 96 octets) for violations of either of the above mentioned reqirements. For example, if system 1 were transmitting information to system 2, the logic of system 1 would format a particular 4 frame group in the manner taught by this method. This 4 frme group of data would be transmitted via multiplexers 3 and 4 to system 2. Since multiplexers 3 and 4 and any interventing repeater circuitry (not shown) are standard commerically available equipment, the ZBTSI method would provide the proper ones density and inhibit the production of any zero octets which violate the consecutive zeros rule without altering any of the transmission equipment already in place. The newly formatted data would be transparent to all multiplexers and repeaters since it would have the proper ones density. Upon receipt of the 4 frames of information, system 2 would then buffer the 96 octets and according to the method reconstruct any all zero octets.

An octet which has all zeros as it contents violates the above mentioned rule and is termed an all zero octet (AZO). The extended superframe consist of 24 frames. Within this superframe, the framing bits (TS or FS) of frames 4, 8, 12, 16 and 24 provide the framing pattern sequence. The framing bits of frames 2, 6, 10, 14, 18 and 22 provide the CRC6 code bits. The framing bits of frames 1, 5, 9, 13, 17 and 21 are used to provide the zero bite time slot interchange processing flags in accordance with this method.

These processing flag bits (framing bits) are set to a logic 1, if no zero byte time slot interchange processing was required during the 4 frame interval. Conversely, these processing flag bits are set to logic 0, if this method was employed in order to change any AZO data before transmission through the system.

This method of zero byte time slot interchange requires only a 2 octet delay at the encoding system and a 96 octet delay at the decoding system. An additional one octet of delay is added at both system in order to examine adjacent octets. In order for a given octet location to be marked by this method as an AZO, this octet must have been a zero octet. Buffereing at the decoder provides a method in which error detection and correction is made easier than encoder type buffering.

Figure 3A:
FIGS. 3A and 3B depict a 96 channel data stream before and after the zero byte time slot method is applied, respectively.
Figure 3B:
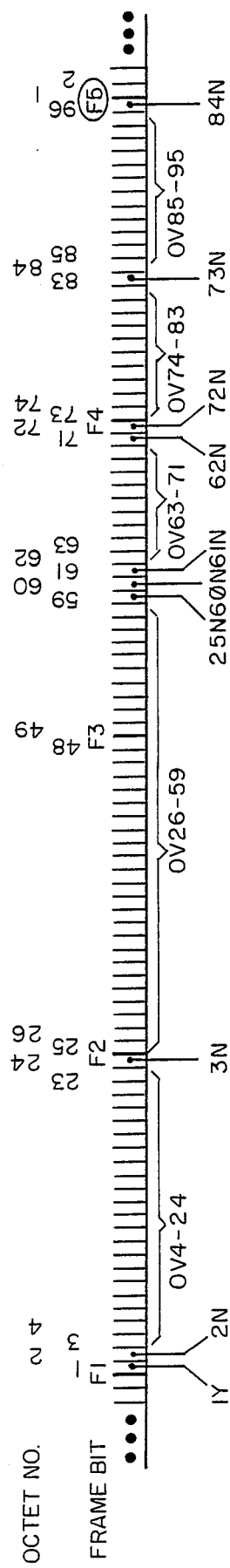

Now turning to FIGS. 3A and 3B, sample data strings are shown FIG. 3A depicts a 4 frame group of octets as originally transmitted without the use of the zero byte time slot interchange method. This original data string includes several octets which are an AZOs. These octets are octet numbers 1, 2, 3, 25, 60, 61, 62, 72, 73 and 84. The octet numbers are shown and their respective contents are shown below, between the hash marks.

FIG. 3B depicts the 4 frame data string produced as a result of the application of the ZBTSI method to the original data stream of FIG. 3A.

In FIG. 3B, several notations and markings exist below the line representing the data bits. These markings indicate the following. The first set of markings are composed of a number followed by a Y or an N which point to the contents of a particular octet. The numeric part of this indicator is the address which is contained in the contents of the octet to which the indicator is pointing. This address is contained in PCM bits PCM7 through PCM1. The eighth bit or PCM0 indicates the last all zero octet indicator for the 4 frame group. The Y or N indicates whether the last all zero bit is set or not. A Y indicates the bit is set with a logic 1 N indicates it is reset with a logic 0.

The other indicator in FIG. 3B consists of an OV followed by two numeric designations. The OV indicates a shift over of each of the octets within the range of the two numbers which follow the OV. For example in FIG. 3B, the OV 4-24 indicates the octets 4 through 24 are shifted down or to the left by one octet position. In addition, the framing bit F5 is circled. This indicates that there were all zero octet within the 4 frame group and that this framing bit is set as a flag to indicate this event.

Figure 4:
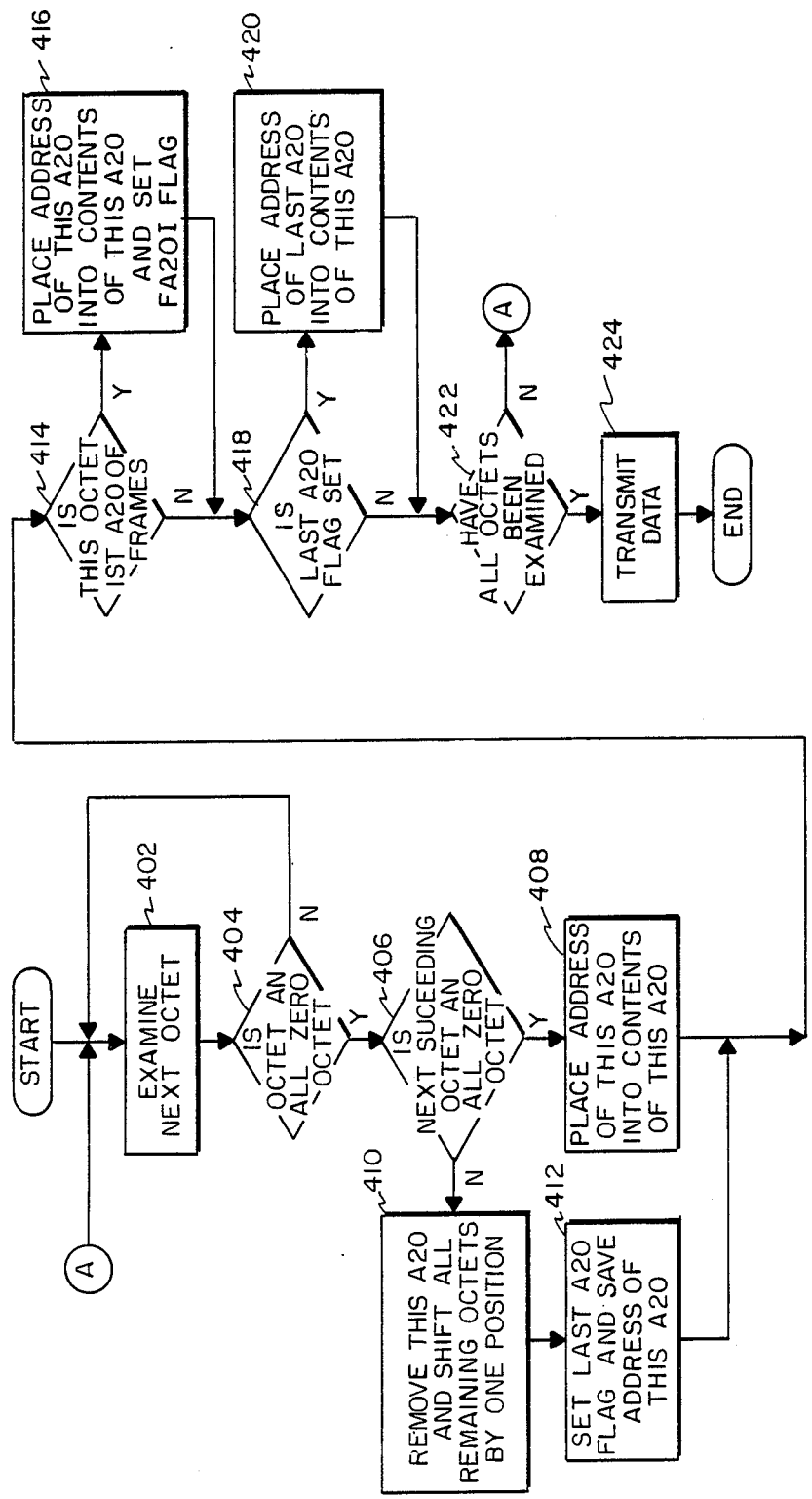
FIG. 4 depicts a logic diagram of the encoding method.

The ZBTSI method is shown in FIG. 4. When the transmitting system has the 4 frame string of data as depicted in FIG. 3A, the logic of the system then perform the ZBTSI method by entering block 402. Block 402 examines the next octet of the data. In this case, the method will start with octet number 1. Then, block 404 is entered. Block 404 determines whether the octet is an all zero octet (AZO). If the contents of this octet enterad to examine the next octet. If this octet was an all zero octet, as the case of octet 1, processing is continued and block 406 is entered via the Y path from block 404.

Block 406 determines whether the next succeeding octet is an all zero octet (AZO). For example, since octet number 2 is an all zero octet, this question would be answered in the affirmative and control would be transferred to block 408 via the Y path. Block 408 places the address of this all zero octet (octet number 1) into the contents of this all zero octet (octet number 1). This means that the address of the first all zero octet which it encountered, octet 1, will be placed into the contents of octet 1. Since all octet addresses 1 through 96 have at least one logic 1 within the address, the contents of these octets, which contain their own addresses, will not be an all zero octet. Therefore, octet 1 will contain in PCM bits 1 through 7 the address 1 and will not violate the AMI transmission rules.

If the next succeeding octet was not an all zero octet, block 406 will transfer control to block 410 via the N path. Block 410 removes the all zero octet and shifts all remaining octets down or to the left by one octet position. Block 412 then sets an internal indicator for a last all zero octet in a string and saves the corresponding address of this all zero octet. Block 412 will then transfer control to block 414.

After block 408 has placed the address of an AZO into the contents of the particular AZO, it will transfer control to block 414. Block 414 determines whether this particular octet is the first AZO in the 4 frame data string. If this question is answered in the affirmative, block 414 transfers control to block 416 via the Y path. Block 416 places the address of this AZO into the contents of this AZO and also sets the FAZOI flag.

The FAZOI flag is the First All Zero Octet Indicator flag. The FAZOI flag is located in PCM bit 0. The setting of this bit indicates that the particular octet with this flag set is the first all zero octet of the 4 frame group and that the decoding system may recognize this as the last AZO to process within the 4 frame group.

Block 416 transfers control to block 418. If block 414 determined that this AZO was not first all zero octet of the 4 frame group, control is transferred to block 418 via the N path.

Block 418 determines whether the internal flag last all zero octet is set. If this internal flag is set, control is transferred from block 418 to block 420 via the Y path. Block 420 places the address of the previous all zero octet into the contents of this all zero octet. For example, since octet number 3 in FIG. 3B was the last all zero octet of the series of all zero octets (1, 2 and 3), the address of octet 3 is placed into the contents of octet number 25. It should be noted that the contents of octet 25 now appear in the octet position 24 since octet number 3 has been removed and all other succeeding octet shifted down by one octet position. Block 420 then transfers control to block 422.

If the internal flag last all zero octet is not set, block 418 transfers control to block 422. Block 422 determines whether all the octets of the 4 frame group have been examined. If all the octets have not been examined, the N path is followed from block 422 and control is transferred to block 402, where the next octet is examined. If the last octet of the 4 frame group has been examined, control is passed from block 422 to block 424. Then, block 424 transmits the data and afterward ends the zero byte time slot interchange process.

This method may be implemented via firmware contained in a digital signal processor. A Fujitsu digital signal processor part number MB-8764-DSP may be employed.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a data transmission system having first and second digital switching systems connected via T-carrier line facilities for the bidirectional transmission of data, each said switching system including a method for Zero Byte Time Slot Interchange (ZBTSI), said ZBTSI method comprising the steps of:

examining an octet (8-bits) of a plurality of frames of data;

first testing said octet for an all zero octet, said all zero octet being an octet containing 8-bits of zeroes;

first placing a corresponding address of said detected all zero octet into a contents of said all zero octet position;

second testing said detected all zero octet for a first all zero octet condition of said plurality of frames;

first setting a first all zero octet indicator in said detected first all zero octet for indicating the first all zero octet of said plurality of frames, said setting being performed in response to said detected first all zero octet; and iterating said steps of examining, first testing, first placing, second testing and first setting for each of said octets for said plurality of frames.

2. A ZBTSI method as claimed in claim 1, wherein there is further included the step of third testing of a next succeeding octet for an all zero octet condition, said third testing being performed in response to said detection of said all zero octet by said step of first testing.

3. A ZBTSI method as claimed in claim 2, said step of third testing including the steps of:

removing said next succeeding all zero octet from said plurality of frames; and shifting all remaining octets of said plurality of frames in the direction of said removed all zero octet, while maintaining a relative position of said remaining octets among one another.

4. A ZBTSI method as claimed in claim 3, said step of third testing further including the steps of:

second setting an internal flag which indicates that said removed all zero octet is a last all zero octet of a plurality of all zero octets within said plurality of frames;

saving an address corresponding to said removed all zero octet; and performing said step of second testing.

5. A ZBTSI method as claimed in claim 4, wherein there is further included the step of fourth testing said last all zero indicator for said set condition.

6. A ZBTSI method as claimed in claim 5, said step of fourth testing including the step of second placing said saved address of said removed all zero octet into the contents of a present all zero octet, said step of second placing being performed in response to a detection of said set condition of said last all zero indicator.

7. A ZBTSI method as claimed in claim 6, wherein there is further included the step of transmitting said data contained in said plurality of frames.

8. A ZBTSI method as claimed in claim 7, said step of first setting including the step of third placing of an address of a present all zero octet into said contents of said present all zero octet, said step of third placing being performed in response to a detection of said first all zero octet condition.

9. A ZBTSI method as claimed in claim 8, wherein there is further included the step third setting a framing bit indicator in response to a detection of at least one all zero octet.

* * * * *